(12) United States Patent
Thorebäck et al.

(10) Patent No.: US 11,902,903 B2
(45) Date of Patent: Feb. 13, 2024

(54) POWER CONTROL (71) Applicant: Telefonaktiebolaget LM Ericsson (publ), Stockholm (SE)

(72) Inventors: Johan Thorebäck, Sundbyberg (SE); Magnus Nilsson, Lund (SE); Torbjörn Wigren, Uppsala (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/924,169

(22) PCT Filed: May 13, 2020

(86) PCT No.: PCT/SE2020/050488
§ 371 (c)(1),
(2) Date: Nov. 9, 2022

(87) PCT Pub. No.: WO2021/230781
PCT Pub. Date: Nov. 18, 2021

(65) Prior Publication Data
US 2023/0180139 A1 Jun. 8, 2023

(51) Int. Cl.
*H04W 52/22* (2009.01)
*H04B 17/10* (2015.01)
*H04B 17/12* (2015.01)

(52) U.S. Cl.
CPC ........ *H04W 52/225* (2013.01); *H04B 17/102* (2015.01); *H04B 17/12* (2015.01)

(58) Field of Classification Search
CPC .............. H04W 52/225; H04W 52/367; H04B 17/102; H04B 17/12; H04B 17/336
(Continued)

(56) References Cited

U.S. PATENT DOCUMENTS 11,246,106 B2 * 2/2022 Cho ...................... H04W 52/52
2007/0091873 A1 * 4/2007 LeBlanc ............... H04M 3/002
370/352
(Continued)

FOREIGN PATENT DOCUMENTS

WO 2020073148 A1 4/2020
WO 2020073191 A 4/2020

OTHER PUBLICATIONS

International Search Report and Written Opinion of the International Searching Authority for PCT International Application No. PCT/SE2020/050488 dated Feb. 9, 2021.

*Primary Examiner* — Don N Vo
(74) *Attorney, Agent, or Firm* — Sage Patent Group (57) ABSTRACT

There is provided a method at a network node equipped with an advance antenna system, AAS. The AAS comprises a plurality of antenna elements and one or more radio frequency integrated circuits, RFICs. Each of the one or more RFICs is associated with one or more of the plurality of antenna elements. The method comprising: capturing a plurality of signal samples of one or more signal chains of each of the one or more RFICs. Each of the one or more signal chains correspond to one or more of the plurality of antenna elements and a signal sample is associated with an envelope power level at an output of the respective signal chain; and summing at least a subset of the plurality of signal samples to obtain a short term average power value at the AAS.

18 Claims, 4 Drawing Sheets

(58) Field of Classification Search
USPC .......................................................... 455/522
See application file for complete search history.

(56) References Cited

U.S. PATENT DOCUMENTS

| | | |
|---|---|---|
| 2017/0373730 A1 | 12/2017 | Pehlke et al. |
| 2018/0062892 A1* | 3/2018 | Tarighat Mehrabani .................... H04L 27/18 |
| 2021/0159946 A1* | 5/2021 | Raghavan .............. H01Q 21/24 |

* cited by examiner

POWER CONTROL

CROSS-REFERENCE TO RELATED APPLICATION

This application is a 35 U.S.C. § 371 national stage application of PCT International Application No. PCT/SE2020/050488 filed on May 13, 2020, the disclosure and content of which is incorporated by reference herein in its entirety.

TECHNICAL FIELD

The present disclosure relates to the field of measurement or estimation of transmitted RF power and control of the transmitted RF power average level, and in particular to average power measurement or estimation and average power control at a network node equipped with an advance antenna system (AAS).

BACKGROUND

Wireless communication system bitrate demands continue to increase. Low frequency spectrum is filled up, and higher frequency spectrum has to be taken into use. In 5G cellular systems a new frequency range is therefore introduced, denoted Frequency Range 2 (FR2) (24250 MHz-52600 MHz).

A major challenge at millimeter wave frequencies (mmW) is to secure a good enough coverage. There are many reasons for this, including very strong diffraction that emphasizes sharp shadowing effects, difficulties to achieve a high-enough transmit power from radio frequency integrated circuits (RFICs), and the decreasing antenna element area that has a direct effect on the path loss counted from transmitter baseband to receiver baseband. It is currently known to introduce a massive use of array antenna technology, known as advanced antenna systems (AAS). This technology contributes to a mitigation of the above-listed problems by means of a radically increased beam gain, increasing the rated equivalent isotropic radiated power (EIRP) of mmW base stations to suitable levels, compensating for the increased coupling loss between the base station and user equipment antennas due to the generally decreased antenna sizes.

In FR2, the beamforming (BF) and beam steering is achieved by coherently combining RF signals from each antenna element of the AAS. By phase shifting and amplification of the signals of the antenna elements, the desired beam is formed.

A low-complexity way of performing beamforming is analogue BF, where the signals to/from the antennas are beamformed in the RF domain close to the antenna. The rest of the signal chain is common to all or a portion of the antennas. What happens then is that all the data is converted into a time domain stream early, before being sent to the RFICs and antennas. Since one set of beam weights is applied during one orthogonal frequency division multiplexing symbol, the beam is therefore spatially fixed for all data. Although it may have peaks in multiple directions, the data stream will be transmitted through one beam pattern, which limits the possibility to simultaneously transmit data to multiple users. This may cause problems when it would be advantageous to direct or receive direct data streams in different directions by frequency selective scheduling. In addition, there may also be problems when the user equipment (UE) is trying to find the base station for initial access. Present FR2 AAS systems use beam sweeping or wider initial beams to combat these issues, but it adds costs in terms of coverage, latency, and/or capacity.

Digital beamforming, on the contrary, uses inverse fast Fourier transform (IFFT) processing to transform complex orthogonal frequency-division multiple access (OFDMA) symbols to data streams in time, with each user accessing all antenna elements independently, thereby allowing frequency selective beamforming. This does, however, require IFFT processing in the RFICs which adds complexity, or alternatively interface bandwidth for IFFT data streams in case of baseband IFFT processing.

Second generation FR2 systems target higher capacity and more connected users. This poses challenges for the analog beamforming method and imposes more and more overhead for beam management. To combat the capacity need, hybrid or digital beamforming can be used. This allows multiplexing of users both in the frequency (FDM) and spatial (SDM) domain. The number of antennas is still high (in the range of several hundreds), and the bandwidth is increasing and approaching ~1 GHz.

By connecting a RFIC analog and digital radio with transmitter and receiver to each antenna element, there would be full freedom to perform arbitrary beamforming in the digital domain. The transmitter part may include digital to analog converters (DACs), low pass filters, up-conversion mixers, programmable gain amplifiers, bandpass filters, and power amplifiers. The receiver part may include a low noise amplifier (LNA), bandpass filters, digital step attenuators, down conversion mixers, low pass filters, and analog to digital converters (ADCs). Between the transmitter part and the receiver part there may be a phase locked loop (PLL) for generating the clock required for up/down conversion mixing. The digital part of the transmission chain at the RFIC starts with reception of time-domain data streams from IFFT processing in a central unit. The RFIC can then perform digital up-conversion (DUC), crest factor reduction (CFR), and send the data stream through a digital predistortion (DPD) block. Afterwards, data can be digital-to-analog converted.

When any radio equipment is to be deployed, radio frequency (RF) electromagnetic field (EMF) exposure regulations need to be accounted for. These exposure limitations are typically based on the guidelines from the International Commission on Non-Ionizing Radiation Protection (ICNIRP), but may take different forms in some countries and regions. The aim of the RF EMF exposure regulations is to secure that the human exposure to RF energy is kept within prescribed limits, which have been set with wide safety margins.

Compliance with the RF EMF exposure limitations also needs to be ensured for 5G mmW base stations and radios are equipped with AASs. These AASs increase the coverage by addition of an antenna array that increase the beamforming gain significantly. The consequence is a concentration of the EMF into certain beam directions. As a further consequence, the traditionally used methods for calculation of RF exposure compliance distances and exclusion zones based on the maximum EIRP of the node, tend to generate significantly increased compliance distances and exclusion zones. This may lead to deployment challenges.

However, the ICNIRP and other RF EMF exposure limitations applicable in the frequency bands used for wireless communications are expressed as the average power density (W/m$^2$) over a specified time interval T. This averaging time is in the order of several seconds or minutes depending on frequency and regulation. Consequently, it is the time-averaged EIRP that is relevant to use when determining RF exposure compliance, and the momentary EIRP can be significantly higher than average EIRP during times shorter that T. Given a distance at which compliance with the RF exposure needs to be ensured, the power density limit can be transformed into a corresponding threshold for the time-averaged total transmitted power. However, the transmitted average power must be kept below the determined power threshold, calculated to obtain a certain exclusion zone. Thus, control functionality is needed that guarantees that the average power is below the limit 100% of the time.

Figure 1:
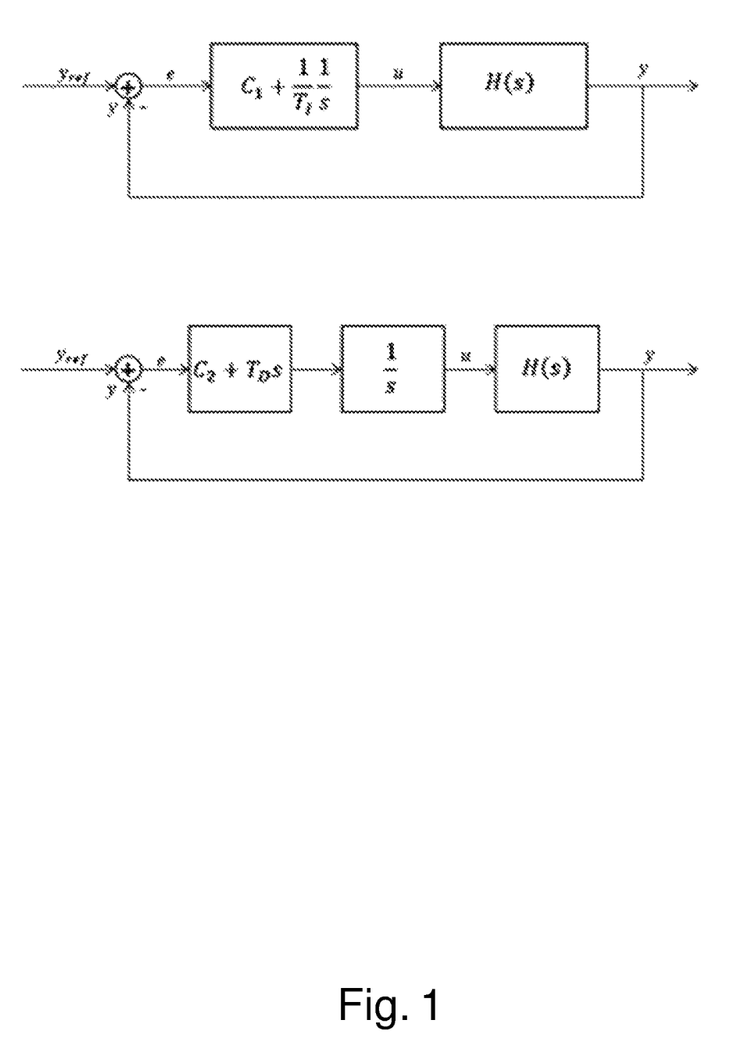
FIG. 1 illustrates two realizations of PI control using a dynamic scheduler limiter, which can be applied in embodiments of the disclosure for average power control.

FIG. 1 illustrates two realizations of proportional and integrating (PI) control using a dynamic scheduler limiter, which can be applied in embodiments of the disclosure for average power control. For ease of reference, the realization shown at the top of FIG. 1 will be referred to herein as the "first realization" and the realization shown at the bottom of FIG. 1 will be referred to herein as the "second realization". Compared with the first realization, the second realization includes a factored out integrator, which can be applied in embodiments of the disclosure.

The relationship between the parameters of the first realization and the second realization can be obtained by equating the coefficients for equal degrees of s in the below formula:

$$C_1 + \frac{1}{T_I}\frac{1}{s} \equiv (C_2 + T_D s)\frac{1}{s} = T_D + C_2 \frac{1}{s} \qquad (1)$$

In order to obtain a smooth behavior of the dynamic resource threshold applied in the scheduler to limit the output power, the control signal to the limiter which commands adjustments (i.e. increasing or decreasing) needs to be rate-controlled, or equivalently, the dynamic threshold system contains the former integration of the PI controller. The determination of the dynamics of the actuator mechanism (dynamic resource threshold) can be represented by the formula below:

$$\dot{\gamma}(t) = u(t) \qquad (2)$$

where $\gamma(t)$ is the dynamic resource threshold and u(t) is the control signal which will be discussed in more detail below. t denotes continuous time. This is in line with the factored PI control structure as discussed with reference to FIG. 1. The dynamic resource threshold is decoupled from the scheduler algorithms themselves, and it expresses a fractional limitation of the scheduler such that it does not use more than a fraction $\gamma(t)$ of its total resources. The scheduler may then limit the number of frequency resources physical resource blocks (PRBs), or limit any other quantity that correlates well with the short term transmit power.

The maximum value of $\gamma(t)$ is 1.0 since this is used to express a fraction of the maximum amount of scheduler resources. There is also a need to limit its lower value so as to avoid the dynamic feedback control mechanism from reducing it to an unphysical value below 0.0. The following scheduler threshold limitation represented by the formula below can therefore be applied each time:

$$\gamma_{low} \leq \gamma(t) \leq 1.0 \qquad (3)$$

An alternative approach would be to replace the measured power by a predicted output power, using information available in the scheduler or elsewhere in the baseband. This quantity can be obtained for example by summing the PRBs allocated by the scheduler at each time instant, over the time T.

This approach, however, is subject to a number of errors. These include, for example, the actual power errors caused by retransmissions, power boosting and power sharing between transmission layers errors, as well as errors caused by radio signal processing close to the antenna, including e.g. clipping to achieve peak to average power reductions, and antenna alignment errors. In addition, regulatory bodies may not accept a baseband prediction, and require measurement close to the AAS.

The total short term average output power applied by a RFIC to one or more antenna elements of the AAS should be measured for this alternative approach to be feasible. There is currently no available solution regarding how this can be achieved. Hence, there is a need for a measurement functionality for the measurement of short term average power value close to the antenna elements on RFICs.

SUMMARY

One aspect of the present disclosure provides a method at a network node equipped with an advance antenna system, AAS, wherein the AAS comprises a plurality of antenna elements and one or more radio frequency integrated circuits, RFICs, and wherein each of the one or more RFICs is associated with one or more of the plurality of antenna elements, the method comprising: capturing a plurality of signal samples of one or more signal chains of each of the one or more RFICs, wherein each of the one or more signal chains correspond to one or more of the plurality of antenna elements and a signal sample is associated with an envelope power level at an output of the respective signal chain; and summing at least a subset of the plurality of signal samples to obtain a short term average power value at the AAS.

Another aspect of the disclosure provides a computer program product comprising a computer readable medium, the computer readable medium having computer readable code embodied therein, the computer readable code being configured such that, on execution by a suitable computer or processor, the computer or processor is caused to perform the method as described herein.

Another aspect of the disclosure provides a network node equipped with an advance antenna system, AAS, wherein the AAS comprises a plurality of antenna elements and one or more radio frequency integrated circuits, RFICs, and wherein each of the one or more RFICs is associated with one or more of the plurality of antenna elements, wherein the network node comprises processing circuitry configured to: capture a plurality of signal samples of one or more signal chains of each of the one or more RFICs, wherein each of the one or more signal chains correspond to one or more of the plurality of antenna elements and a signal sample is associated with an envelope power level at an output of the respective signal chain; and sum at least a subset of the plurality of signal samples to obtain a short term average power value at the AAS.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Embodiments of the disclosure thus allow measurement of average power on RFICs close to antenna elements, thereby securing AAS deployment in cases where short term average power measurements are required as a basis for average power control for RF EMF exposure limitation compliance. Furthermore, embodiments of the present disclosure provide methods for obtaining representative short term average power values per signal chain in a way that prevents systematic errors, such as those occurring in case synchronization times are selected each time a signal sample is captured. Embodiments described herein involve deterministic means to avoid such transmission events that occur at fixed points in time from being overrepresented, as well as random sampling means for selection of, for example, an interval selected for capturing signal samples at signal chains.

Figure 2:
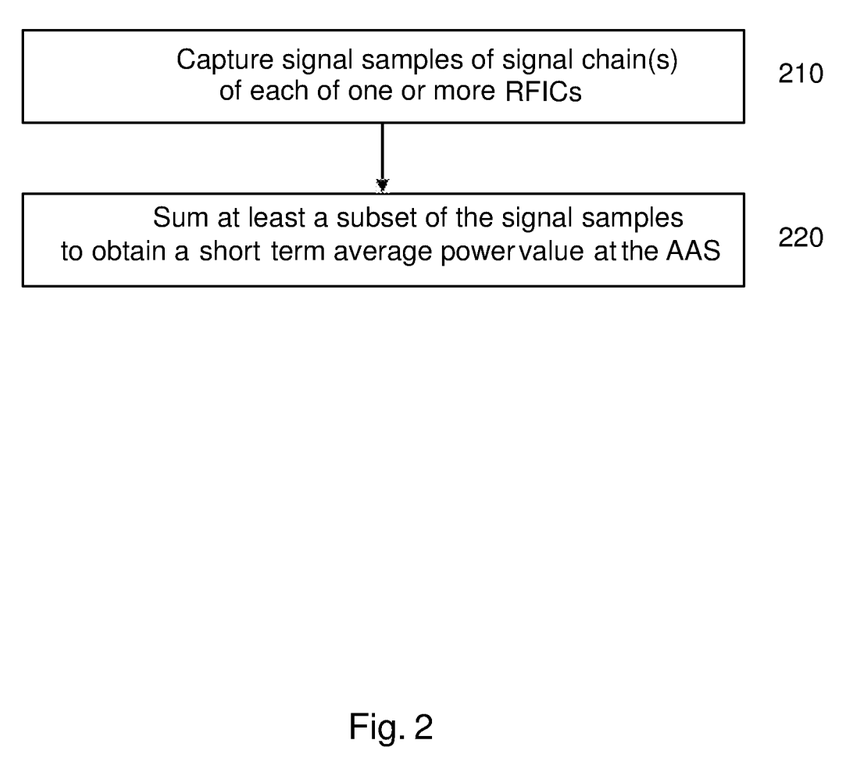
FIG. 2 is a flowchart illustrating a method at a network node equipped with an advance antenna system, according to an embodiment.

FIG. 2 is a flowchart illustrating a method at a network node equipped with an advance antenna system (AAS), according to an embodiment. The illustrated method can generally be performed by or under the control of a computer or processor. The AAS comprises a plurality of antenna elements and one or more radio frequency integrated circuits (RFIC), each of the one or more RFICs being associated with one or more of the plurality of antenna elements.

Moreover, in some embodiments, the AAS may further comprise a radio unit configured to interface with a baseband unit (e.g. via a C2 interface). In some of these embodiments, the baseband unit may further comprise a scheduling unit.

With reference to FIG. 2, at step 210, a plurality of signal samples of one or more signal chains of each of the one or more RFICs are captured. In some embodiments, each of the one or more signal chains may correspond to one or more of the plurality of antenna elements, and a signal sample is associated with an envelope power level at an output of the respective signal chain. In some embodiments, more than one signal chains may be combined and the combined group of signal chains may correspond to one or more of the plurality of antenna elements. This combination may be in the digital domain or in the analog/RF domain.

In some embodiments, capturing each of plurality of signal samples of the one or more signal chains of each of the plurality of RFICs at step 210 may comprise: detecting in-phase and quadrature phase components for the respective signal, and squaring the in-phase and quadrature phase components for the respective signal.

Moreover, in some embodiments, detecting in-phase and quadrature phase components for the respective signal may comprise one of: detecting the in-phase and quadrature phase components over a predetermined period of time, and detecting a predetermined number of in-phase and quadrature phase components.

In some embodiments, capturing of the plurality of signal samples at step 210 may be performed over one or more predetermined intervals. Each of the one or more predetermined intervals may have a predetermined duration, for example 10 ms.

Furthermore, capturing of the plurality of signal samples at step 210 may be performed over a plurality of predetermined intervals, and a time elapsed between the plurality of predetermined intervals may be based on a predetermined pattern. The predetermined pattern may be a random pattern in some embodiments.

Returning to FIG. 2, at step 220, at least a subset of the plurality of signal samples are summed in order to obtain a short term average power value at the AAS. The short term average power value may be regarded as being representative of a short term average power estimate of a large number of time-varying signal vector samples (e.g. I/Q samples) that carry information that is to be modulated into an output RF signal at each of the plurality of antenna elements. In some embodiments, the process of obtaining the short term average power value may be involve averaging of a certain buffer length of consecutive signal samples. The expression "short term" in the context of the present disclosure may be regarded to refer to timeframes in the range of 1 to 100 ms, while "long term" may be regarded to refer to timeframes in the range of 1 to 30 minutes.

It will be appreciated that in some cases 100% of all signal samples over all time may be captured and a sliding average may be determined. Alternatively, results relating to separate buffers may be determined one at a time. In some embodiments, not all 100% of streaming signal samples may be captured, and only a buffer of consecutive signal samples may then be captured (e.g. with a duty cycle of 10%, which is to capture 10% and omit 90% of all signal samples). For example, a particular pattern may be used to capture a buffer of 1 ms, waiting 9 ms, and then capturing the next buffer. In some cases, periodic events in the streaming signal samples may need to be avoided so as to not cause unwanted bias of signal sample capturing. This can be achieved, for example, by introducing a randomized start of each 1 ms buffer.

In some embodiments, the short term average power value at the AAS may be presented by the formula below:

$$P_{tot}(t) = \sum_{RFIC=1}^{L} P_{RFIC,frame} \quad (4)$$

where $P_{tot}(t)$ is the short term average power value at the AAS, $P_{RFIC,frame}$ is a short term average power value per RFIC (measured/estimated within a predetermined interval ("frame"), and L is the number of RFICs in the AAS. The determination of the $P_{RFIC,frame}$ will be explained in more detail in the paragraph below.

In some embodiments, summing at least a subset of the plurality of signal samples at step 220 may comprise: summing, for each of the plurality of RFICs, at least a subset of the plurality of signal samples of each of the one or more signal chains of the respective RFIC, so as to obtain a short term average power value per RFIC, and summing the plurality of short term average power values per RFIC so as to obtain the short term average power value at the AAS. The short term average power value per RFIC may be represented by the formula below:

$$P_{RFIC,frame} = \sum_{chain=1}^{M} P_{chain,frame} \quad (5)$$

wherein $P_{RFIC,frame}$ is the short term average power value per RFIC (measured/estimated within a predetermined interval ("frame")), and $P_{chain,frame}$ is a signal sample at a respective signal chain, and M is the number of antenna elements in the AAS. The determination of the $P_{chain,frame}$ will be explained in more detail in the paragraph below. The above formula, i.e. (5), assumes one antenna element per signal chain, but it will be readily appreciated that in alternative embodiments the formula can be modified for a different arrangement.

As mentioned above, in some embodiments at step 210 capturing each of plurality of signal samples of the one or more signal chains of each of the plurality of RFICs at step 210 may comprise: detecting in-phase and quadrature phase components for the respective signal, and squaring the in-phase and quadrature phase components for the respective signal. In these embodiments, at step 220, summing at least a subset of the plurality of signal samples may comprise summing or integrating the squared in-phase and quadrature phase components for the plurality of signal samples to obtain a power estimate that is representative of the short term average power value at the AAS. The averaged value of a signal sample at a signal chain may be represented by the formula below:

$$P_{chain,frame} = \frac{1}{N}\sum_{i=1}^{N} I^2(t_i) + Q^2(t_i) \quad (6)$$

where $P_{chain,frame}$ is a signal sample at a respective signal chain, N is the number of signal samples measured during a predetermined time interval, i is the order of the signal samples in the sequence of N signal samples, $I^2(t_i)$ is the square of the in-phase component for the respective signal at time $t_i$, and $Q^2(t_i)$ is the square of the quadrature phase component for the respective signal at time $t_i$.

In some embodiments, the signal sample at a respective signal chain may be normalized and in other embodiments the signal sample may not be normalized. In some embodiments, a square root of the summed/integrated squared in-phase and quadrature phase components may be determined in the operation of determining the averaged value of a signal sample at a signal chain.

Although not illustrated in FIG. 2, in some embodiments the method may further comprise, prior to capturing the plurality of signal samples of the one or more signal chains of each of the plurality of RFICs at step 210, configuring a power meter point for each of the plurality of signal chains. In these embodiments, a power meter point is configured to capture signal samples of the respective signal chain. Configuring a power meter point may comprise assigning the respective power meter point in a relative location along the respective signal chain. The assigned relative position in the respective signal chain may be after a crest factor reduction (CFR) block in the respective signal chain. Thus, the respective power meter point may be configured to perform respective measurements before digital predistortion (at a digital predistortion (DPD) block at the RFIC) takes place.

The respective locations of the power meter points allow for accurate signal capture since a closed loop DPD adaptation is run and thereby the transmitted power is sensed via reuse of a receiver part of the RFIC. The DPD block is also subject to extensive power sensing supervision internally in order to secure accurate operation. Through the adaptation of the DPD, it would be possible to establish a scaling factor between digital data at the input of the DPD and the corresponding instantaneous power delivered from the output of the signal chain. Consequently, it would be possible to also establish the proper scaling factor for different positions of the power meters and the output of the signal chain.

Although it is described above that the method may comprise configuring a power meter point for each of the plurality of signal chains, it will be appreciated that in alternative embodiments, not necessarily all of the plurality of signal chains are configured with a power meter point. In some cases there may be a limited number of power meter points that are usable at any given time. This means that power meter resources can be time-shared between the plurality of signal chains. Thus, in these embodiments signal samples may not be captured continuously for all of the plurality of signal chains. However, since signal samples are averaged per RFIC, and then further averaged in a time window associated with average power control, even if the time window may be 100 ms, a 10 ms interval over which signal samples are captured would be acceptable due to the law of large numbers.

In addition, although also not illustrated in FIG. 2, in some embodiments the method may further comprise, prior to capturing the plurality of signal samples of one or more signal chains of each of the one or more RFICs at step 210, the following steps: capturing a calibration set of signal samples of the one or more signal chains of each of the one or more RFICs at the AAS and at the baseband unit, and calibrating the baseband unit based on the calibration set of signal samples. In these embodiments, capturing of the plurality of signal samples of one or more signal chains of each of the one or more RFICs at step 210 may be performed at the baseband unit. Also, the calibration set of signal samples captured at the AAS may be a highly limited set relative to all the signal samples, and these may be used for the purpose of establishing the response/correlation between capturing points in the baseband unit and the AAS. Once the calibration is performed, capturing of longer signal sequences can be performed at the baseband unit, which may be beneficial in terms of offloading task processing at the AAS.

Although not illustrated in FIG. 2, in some embodiments the method may further comprise: summing at least a subset of the plurality of signal samples to obtain a plurality of short term average power values at the AAS, storing, in a sliding time window, the plurality of short term average power values at the AAS, wherein the duration of the sliding time window is longer than the duration under which the plurality of short term average power samples were captured, and performing average power control over the duration of the sliding time window, based on the stored short term average power values. Furthermore, as mentioned above, in some embodiments the baseband unit may further comprise a scheduling unit. In these embodiments, the average power control may be performed by carrying out the following steps: acquiring, at the baseband unit, a set-point average power value, determining an average power value by obtaining an average of the stored plurality of short term average power values at the AAS, determining, at baseband unit, a difference between the set-point average power value and the determined average power value, and adjusting, at the scheduling unit, a limit associated with an amount of resources used at the AAS based on the determined difference between the set-point average power value and the average power value.

Figure 3:
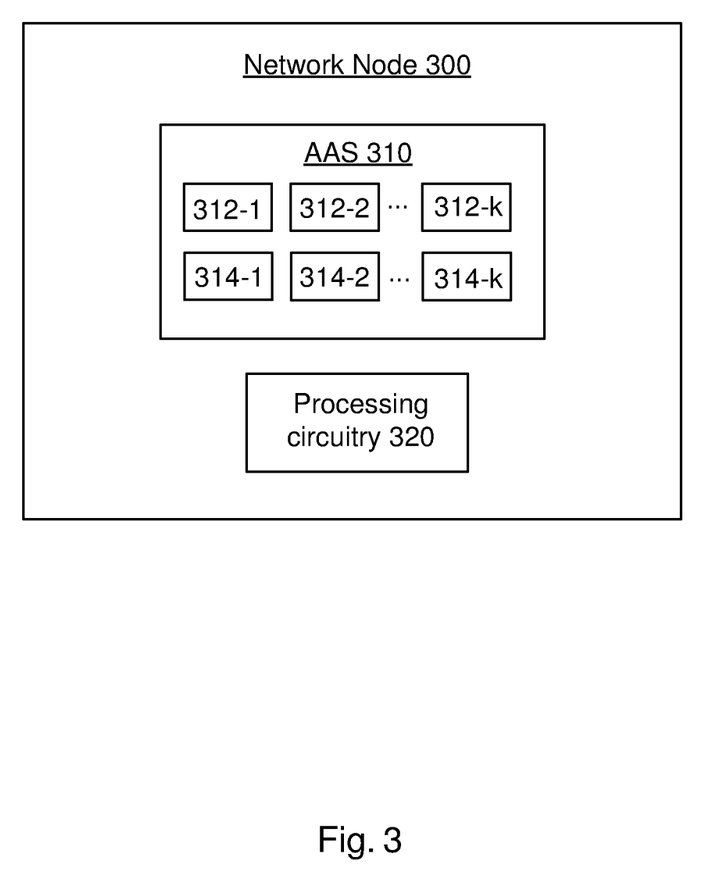
FIG. 3 is a block diagram of a network node, according to an embodiment.

FIG. 3 is a block diagram of a network node, according to an embodiment. The network node 300 is equipped with an advance antenna system (AAS) 310, the AAS comprising a plurality of antenna elements 312-1 to 312-k and one or more radio frequency integrated circuits (RFICs) 314-1 to 314-k. In some embodiments, the network node may be a Next Generation Node B (gNB).

In the present embodiment, each of the one or more RFICs 314-1 to 314-k is associated with one or more of the plurality of antenna elements 312-1 to 212-k. The network node 300 further comprises processing circuitry 320. In some embodiments, the AAS may further comprise a radio unit configured to interface with a baseband unit. Furthermore, although the processing circuitry 320 in FIG. 2 is illustrated as a single entity at the network node 300, it will be appreciated that the processing circuitry may comprise one or more processing units at the AAS level as well as a plurality of processing units, each of the plurality of processing unit being configured at one of the one or more RFICs 314-1 to 314-k.

The processing circuitry 320 is configured to capture a plurality of signal samples of one or more signal chains of each of the one or more RFICs, and to sum at least a subset of the plurality of signal samples to obtain a short term average power value at the AAS 310. In particular, the plurality of processing units of the processing circuitry 320 which are configured at each of the RFICs 314-1 to 315-k may be configured to perform the capturing and summing operation. Each of the one or more signal chains corresponds to one or more of the plurality of antenna elements 312-1 to 312-k, and a signal sample is associated with an envelope power level at an output of the respective signal chain. At least in the context of the present disclosure, an envelope power level is understood to refer to as the instantaneous RF power level averaged over one RF period. The determination of the short term average power value at the AAS may be represented in a similar manner as proposed by formula (4) as provided above with reference to FIG. 2.

In some embodiments, the processing circuitry 320 may be configured to sum the at least a subset of the plurality of signal samples by performing the following steps: summing, for each of the plurality of RFICs 314-1 to 314-k, at least a subset of the plurality of signal samples of each of the one or more signal chains of the respective RFIC, so as to obtain a short term average power value per RFIC, and summing the plurality of short term average power values per RFICs so as to obtain the short term average power value at the AAS 310. The determination of the short term average power values per RFIC may be represented in a similar manner as proposed by formula (5) as provided above with reference to FIG. 2.

In some embodiments, the processing circuitry 320 may be configured to capture each of the plurality of signal sample of the one or more signal chains of each of the plurality of RFICs 314-1 to 314-k by performing the following steps: detecting in-phase and quadrature phase components for the respective signal, and squaring the in-phase and quadrature phase components for the respective signal. In these embodiments, the processing circuitry 320 may be configured to sum at least a subset of the plurality of signal samples by summing or integrating the squared in-phase and quadrature components of the plurality of signal samples to obtain a power estimate that is representative of the short term average power value at the AAS 310. The averaged value of a signal sample at a signal chain may be represented in a similar manner as proposed by formula (6) as provided above with reference to FIG. 2.

Furthermore, in some embodiments the processing circuitry 320 may be configured to detect in-phase and quadrature phase components for the respective signal by performing one of the following steps: detecting the in-phase and quadrature phase components over a predetermined period of time, and detecting a predetermined number of in-phase and quadrature phase components.

In some embodiments, the processing circuitry 320 may be configured to capture the plurality of signal samples over one or more predetermined intervals. Each of the one or more predetermined intervals may have a predetermined duration. In some embodiments, the one or more predetermined intervals may be configured such that they avoid or exclude high/low power scheduling time slots, so as to avoid introducing unwanted bias to the short term average power value. The processing circuitry 320 may also be configured to capturing the plurality of signal samples over a plurality of predetermined intervals, and a time elapsed between the plurality of predetermined intervals may be based on a predetermined pattern.

The predetermined pattern may be a random pattern.

The processing circuitry 320 may be configured to, prior to capturing the plurality of signal samples of the one or more signal chains of each of the plurality of RFICs 314-1 to 314-k, configure a power meter point for each of the plurality of signal chains. A power meter point may be configured to capture signal samples of the respective signal chain. In these embodiments, the processing circuitry 320 may be configured to configure a power meter point by assigning the respective power meter point in a relative location along the respective signal chain. The assigned relative position in the respective signal chain may be after a crest factor reduction (CFR) block in the respective signal chain.

Also, in some embodiments the processing circuitry 320 may be configured to, prior to capturing the plurality of signal samples of one or more signal chains of each of the one or more RFICs 314-1 to 314-k: capture a calibration set of signal samples of the one or more signal chains of each of the one or more RFICs 314-1 to 314-k at the radio unit and the baseband unit, and calibrate the baseband unit based on the calibration set of signal samples. In these embodiments, the processing circuitry 320 may be configured to capture the plurality of signal samples of one or more signal chains of each of the one or more RFICs 314-1 to 314-k at the baseband unit.

In some embodiments, the processing circuitry 320 may be configured to: sum at least a subset of the plurality of signal samples to obtain a plurality of short term average power values at the AAS, store, in a sliding time window, the plurality of short term average power values at the AAS, wherein the duration of the sliding time window is longer than the duration under which the plurality of short term average power samples were captured, and perform average power control over the duration of the sliding time window, based on the stored short term average power values. In some of these embodiments, the baseband unit may comprise a scheduling unit, and the processing circuitry 320 may be configured to perform average power control by carrying out the following steps: acquiring, at the baseband unit, a set-point average power value, determining an average power value by obtaining an average of the stored plurality of short term average power values at the AAS, determining, at baseband unit, a difference between the set-point average power value and the determined average power value, and adjusting, at the scheduling unit, a limit associated with an amount of resources used at the AAS based on the determined difference between the set-point average power value and the average power value.

Figure 4:
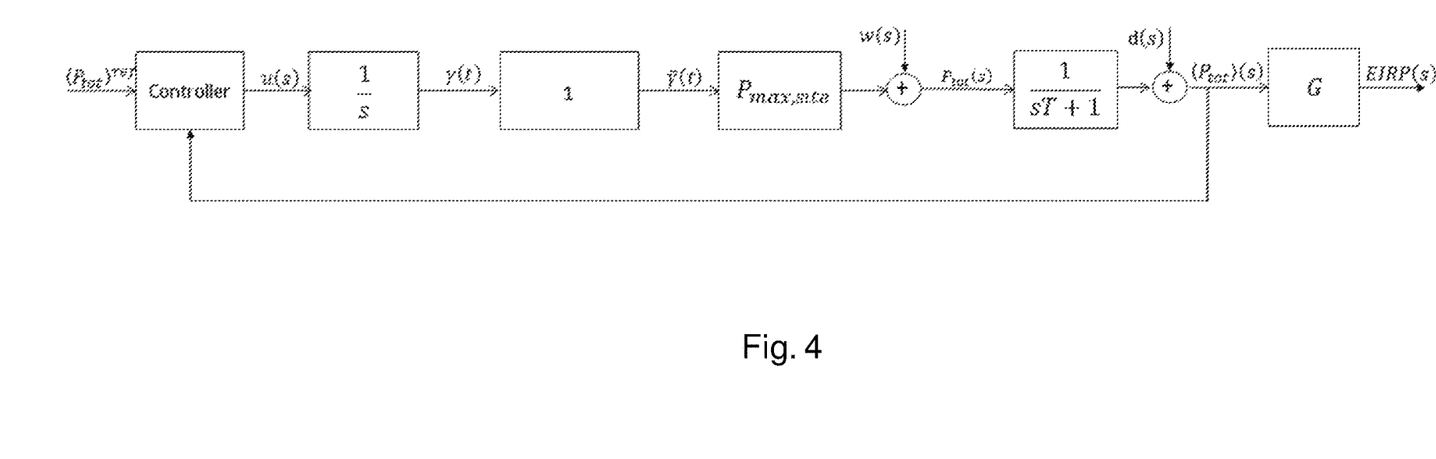
FIG. 4 illustrates an example of feedback control mechanism that is used to control short term average power, which can be applied in embodiments of the present disclosure.

FIG. 4 illustrates an example of feedback control mechanism that is used to control average power, which can be applied in embodiments of the present disclosure.

In FIG. 4, $<P_{tot}>^{ref}$ denotes the set-point average power value. Typically, this set-point average power value is slightly lower than the threshold value that can be obtained based on a regulatory power density and a desired compliance distance (cf. Table 1 above). The set-point average power value is input to the controller (which may be a part of processing circuitry of a network node) which then outputs a control signal u(s) based on the value of set-point average power value as well as the short term average power value $P_{tot}(s)$. The short term average power value will be explained in more detail below.

Furthermore, in FIG. 4, 1/s denotes the actuator dynamics with lower and upper limits, where s denotes a Laplace transform variable, and $\bar{\gamma}(t)$ denotes the limitation of the scheduling unit after lower and upper limitation (inactive and therefore not shown in FIG. 4). $P_{max\_site}$ denotes the maximum total power of the node. w(t) denotes a disturbance presenting predicted power errors. 1/(sT+1) represents an autoregressive simplified model of an averaging operation for determining an averaged total power of the node, where T represents a predetermined period of time. $<P_{tot}>(s)$ denotes the averaged short term average power. e(s) denotes a measurement error. Thus, the short term average power value is denoted as $P_{tot}(s)$. Furthermore, G denotes antenna gain. EIRP(s) denotes the equivalent isotropic radiated power (EIRP).

It is noted that all quantities here are expressed in the Laplace transform domain, i.e. expressed in terms of the variable s, which is allowed since the feedback control mechanism design is performed with constraints inactive. It is further noted that w(s) and e(s) are only mathematical approximations in the feedback control mechanism which are useful for assessing performance aspects of embodiments of the disclosure, but in some embodiments they may not necessarily be a part of the methods as described herein.

Thus, embodiments of the present disclosure provide methods and apparatuses for measuring average power on RFICs close to antenna elements, thereby securing AAS deployment in cases where short term average power measurements are required as a basis for average power control for RF exposure limitation compliance.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above disclosure sets forth specific details, such as particular embodiments or examples for purposes of explanation and not limitation. It will be appreciated by one skilled in the art that other examples may be employed apart from these specific details.

The invention claimed is:

1. A method at a network node equipped with an advance antenna system, AAS, wherein the AAS comprises a plurality of antenna elements and one or more radio frequency integrated circuits, RFICs, and wherein each of the one or more RFICs is associated with one or more of the plurality of antenna elements, the method comprising:
   capturing a plurality of signal samples of one or more signal chains of each of the one or more RFICs, wherein each of the one or more signal chains corresponds to one or more of the plurality of antenna elements and a signal sample is associated with an envelope power level at an output of the respective signal chain; and summing at least a subset of the plurality of signal samples to obtain a short term average power value at the AAS.

2. The method according to claim 1, wherein summing at least a subset of the plurality of signal samples comprises:

summing, for each of the plurality of RFICs, at least a subset of the plurality of signal sample of each of the one or more signal chains of the respective RFIC, so as to obtain a short term average power value per RFIC; and summing the plurality of short term average power values per RFIC so as to obtain the short term average power value at the AAS.

3. The method according to claim 1, wherein capturing each of plurality of signal sample of the one or more signal chains of each of the plurality of RFICs comprises:

detecting in-phase and quadrature phase components for the respective signal; and squaring the in-phase and quadrature phase components for the respective signal, and wherein summing at least a subset of the plurality of signal samples comprises summing or integrating the squared in-phase and quadrature phase components for the plurality of signal samples to obtain a power estimate that is representative of the short term average power value at the AAS.

4. The method according to claim 3, wherein detecting in-phase and quadrature phase components for the respective signal comprises one of:

detecting the in-phase and quadrature phase components over a predetermined period of time; and detecting a predetermined number of in-phase and quadrature phase components.

5. The method according to claim 1, wherein capturing of the plurality of signal samples is performed over one or more predetermined intervals.

6. The method according to claim 5, wherein each of the one or more predetermined intervals has a predetermined duration.

7. The method according to claim 5, wherein capturing of the plurality of signal samples is performed over a plurality of predetermined intervals, and a time elapsed between the plurality of predetermined intervals is based on a predetermined pattern.

8. The method according to claim 7, wherein the predetermined pattern is a random pattern.

9. The method according to claim 1, further comprising, prior to capturing the plurality of signal samples of the one or more signal chains of each of the plurality of RFICs, configuring a power meter point for each of the plurality of signal chains, wherein a power meter point is configured to capture signal samples of the respective signal chain.

10. The method according to claim 9, wherein configuring a power meter point comprises assigning the respective power meter point in a relative location along the respective signal chain.

11. The method according to claim 10, wherein the assigned relative position in the respective signal chain is after a crest factor reduction, CFR, block in the respective signal chain.

12. The method according to claim 1, wherein the AAS further comprises a radio unit configured to interface with a baseband unit.

13. The method according to claim 12, wherein the method further comprises, prior to capturing the plurality of signal samples of one or more signal chains of each of the one or more RFICs:

capturing a calibration set of signal samples of the one or more signal chains of each of the one or more RFICs at the radio unit and at the baseband unit; and calibrating the baseband unit based on the calibration set of signal samples, wherein capturing of the plurality of signal samples of one or more signal chains of each of the one or more RFICs is performed at the baseband unit.

14. A computer program product comprising a computer readable medium, the computer readable medium having computer readable code embodied therein, the computer readable code being configured such that, on execution by a suitable computer or processor, the computer or processor is caused to perform the method according to claim 1.

15. A network node equipped with an advance antenna system, AAS, wherein the AAS comprises a plurality of antenna elements and one or more radio frequency integrated circuits, RFICs, and wherein each of the one or more RFICs is associated with one or more of the plurality of antenna elements, wherein the network node comprises processing circuitry configured to:

capture a plurality of signal samples of one or more signal chains of each of the one or more RFICs, wherein each of the one or more signal chains corresponds to one or more of the plurality of antenna elements and a signal sample is associated with an envelope power level at an output of the respective signal chain; and sum at least a subset of the plurality of signal samples to obtain a short term average power value at the AAS.

16. The network node according to claim 15, wherein the sum at least a subset of the plurality of signal samples comprises:

sum, for each of the plurality of RFICs, at least a subset of the plurality of signal sample of each of the one or more signal chains of the respective RFIC, so as to obtain a short term average power value per RFIC; and sum the plurality of short term average power values per RFIC so as to obtain the short term average power value at the AAS.

17. The network node according to claim 15, wherein capture a plurality of signal samples of the one or more signal chains of each of the plurality of RFICs comprises:

detect in-phase and quadrature phase components for the respective signal; and square the in-phase and quadrature phase components for the respective signal, and wherein sum at least a subset of the plurality of signal samples comprises sum or integrate the squared in-phase and quadrature phase components for the plurality of signal samples to obtain a power estimate that is representative of the short term average power value at the AAS.

18. The network node according to claim 17, wherein detect in-phase and quadrature phase components for the respective signal comprises one of:

detect the in-phase and quadrature phase components over a predetermined period of time; and detect a predetermined number of in-phase and quadrature phase components.

* * * * *